(12) United States Patent
Kobayashi et al.

(10) Patent No.: US 8,504,176 B2
(45) Date of Patent: Aug. 6, 2013

(54) CPU UNIT OF PLC, SYSTEM PROGRAM FOR PLC, AND RECORDING MEDIUM STORING SYSTEM PROGRAM FOR PLC

(75) Inventors: Akiro Kobayashi, Kusatsu (JP); Yukio Iname, Kyoto (JP); Tetsushi Jakunen, Kusatsu (JP); Yoshihide Nishiyama, Yokohama (JP)

(73) Assignee: Omron Corporation, Kyoto (JP)

( * ) Notice: Subject to any disclaimer, the term of this patent is extended or adjusted under 35 U.S.C. 154(b) by 42 days.

(21) Appl. No.: 13/399,083

(22) Filed: Feb. 17, 2012

(65) Prior Publication Data

US 2012/0239201 A1    Sep. 20, 2012

Related U.S. Application Data

(63) Continuation of application No. PCT/JP2011/056777, filed on Mar. 22, 2011.

(30) Foreign Application Priority Data

Mar. 15, 2011  (JP) ................................. 2011-056776

(51) Int. Cl.
*G05B 19/18* (2006.01)
(52) U.S. Cl.
USPC ............................................ 700/56; 700/275
(58) Field of Classification Search
None
See application file for complete search history.

(56) References Cited

U.S. PATENT DOCUMENTS

2012/0239172 A1* 9/2012 Nishiyama et al. ............. 700/86
2012/0239978 A1* 9/2012 Narutani et al. ................ 714/32

FOREIGN PATENT DOCUMENTS

| JP | 11-219211   | 8/1999 |
| JP | 2000-20114  | 1/2000 |
| JP | 2006-48231  | 2/2006 |
| JP | 2007-140655 | 6/2007 |

* cited by examiner

*Primary Examiner* — Ryan Jarrett
(74) *Attorney, Agent, or Firm* — Greenblum & Bernstein, P.L.C.

(57) ABSTRACT

A system includes a first execution control instruction to start execution of a first control program every first execution cycle of the same period as a control cycle period and a second execution control instruction to start execution of a second control program every second execution cycle whose period is an integral multiple of at least twice the control cycle period. The second execution control instruction includes an instruction to start, in a control cycle in which a second execution cycle starts, execution of the second control program after the end of execution of the first control program, and if the second control program is not completed before the end of the control cycle, to start execution of an unexecuted part of the second control program after the end of execution of the first control program in the next control cycle.

12 Claims, 10 Drawing Sheets

US 8,504,176 B2

CPU UNIT OF PLC, SYSTEM PROGRAM FOR PLC, AND RECORDING MEDIUM STORING SYSTEM PROGRAM FOR PLC

CROSS-REFERENCE TO RELATED APPLICATIONS

This is a continuation application of PCT/JP2011/056777 filed Mar. 22, 2011, designating the United States of America, the disclosure of which, including the specification, drawings, and claims, is incorporated by reference in its entirety. The disclosure of Japanese Patent Application No. 2011-056776 filed Mar. 15, 2011, including the specification, drawings, and claims is expressly incorporated herein by reference in its entirety.

FIELD OF DISCLOSURE

The present disclosure relates to motion control processes for controlling motor movement, which are executed in a PLC (Programmable Logic Controller, also referred to as a programmable controller) used for controlling operation of a machine, equipment, or the like.

BACKGROUND INFORMATION

A PLC includes a plurality of units, such as a CPU (Central Processing Unit) unit including a microprocessor, which executes a user program, an IO (Input Output) unit which receives a signal from an external switch or sensor and outputs a signal to an external relay or actuator, or the like. The PLC executes a control operation while exchanging data with these units via a PLC system bus and/or a field network in each execution cycle of the user program.

The control of operation of machines, equipment, etc. may include a motion control for controlling motor movement. Conventionally, such a motion control, typified by a control process (execution of a motion operation program) in which a command value is periodically output to a motor driver for driving the motor, has been performed in a motion controller that is provided separately from the PLC. However, in the field of information technology, the speed of microprocessors and communication networks is becoming higher and higher. Therefore, these technologies have enabled a single microprocessor to execute not only the user program but also the motion operation program in a PLC.

For example, Patent Document 1 (JP 2007-140655 A) describes a configuration in which a motion control function of controlling a motor and a PLC function of executing a sequence operation (user program) are processed by a single CPU. More specifically, "a fixed-cycle motion control process and axial processes" and "a high-speed sequence process" are executed in each cycle of a basic clock, and "a low-speed sequence process" or "a non-fixed-cycle motion control process" is executed in the remainder of each basic clock cycle.

PATENT DOCUMENTS

Patent Document 1: JP 2007-140655 A

PROBLEM TO BE SOLVED BY THE DISCLOSURE

In order to integrate the function of executing the motion operation program into the PLC microprocessor, it may be naturally contemplated that, similar to conventional motion controllers, a command value for the motor driver is calculated and the calculation result is output in an execution cycle having a fixed period, and the user program is executed and other PLC operations are performed in the remainder of each execution cycle. However, if all processes required for operation of the PLC performing a motion control are executed in each execution cycle, the execution cycle needs to have a long period. In this case, the period of time in which the command value is output to the motor driver becomes long, and therefore, it becomes difficult to perform a high-speed and high-precision motion control.

Patent Document 1 implicitly suggests that the execution cycle of "the fixed-cycle motion control process and each axial process" and "the high-speed sequence process" is reduced by separating "the fixed-cycle motion control process and each axial process" and "the high-speed sequence process" which are executed in each basic clock cycle from "the low-speed sequence process" and "the non-fixed-cycle motion control process" which are not always executed in each basic clock cycle. However, in Patent Document 1, each process is not specifically described. In particular, it is unclear how "the high-speed sequence process" and "the low-speed sequence process" are specifically distinguished from each other, and how or whether "the high-speed sequence process" and "the low-speed sequence process" are related to the motion control process. Although "the non-fixed-cycle motion control process" is not specifically described, the term suggests a kind of motion control process. In this case, it is not preferable that the motion control process be executed in cycles having a non-fixed period.

It is an object of the present disclosure to provide a PLC having a motion control function which, while providing execution cycles having a relatively short period for some motion control processes requiring high-speed processing, can execute other motion control processes in cycles having a fixed period.

SUMMARY OF THE DISCLOSURE

According to an aspect of the present disclosure, a CPU unit of a PLC controlling an object of control is provided. The CPU unit of PLC includes a microprocessor, storage means (a storage), and a communication circuit.

The CPU unit of a PLC is configured to control the object of control by repeating transmission of output data, reception of input data and execution of a control program producing the output data using the input data. The communication circuit transmits the output data and receives the input data in a control cycle period. The storage means (storage) is used for storing a system program and the control program. The microprocessor executes the system program and the control program. The control program includes first and second control programs. The first control program includes a first motion operation program producing first motion command value data for controlling motor movement. The second control program includes a second motion operation program producing second motion command value data for controlling motor movement. At least one of the first and second control programs includes a user program created in accordance with an object of control of a user and including an instruction to provide the first and second motion operation programs with a command necessary for execution. The system program includes a first execution control instruction causing the microprocessor to start execution of the first control program at every first execution cycle of the same period as the control cycle period, and a second execution control instruction causing the microprocessor to start execution of the second control program at every second execution cycle whose period is an integral multiple of at least twice the control cycle period. The second execution control instruction includes an instruction causing the microprocessor to start, in the control cycle in which the second execution cycle starts, execution of the second control program after the end of execution of the first control program, and if the second control program is not completed before the end of the control cycle, to start execution of an unexecuted part of the second control program after the end of execution of the first control program in the next control cycle.

Preferably, the system program causes the microprocessor to execute a process for providing the output data to be transmitted with the first motion command value data updated by the execution of the first motion operation program, at each first execution cycle, while the first motion operation program is in an active state, and a process for providing the output data to be transmitted with the second motion command value data updated by the execution of the second motion operation program, at least at each second execution cycle, while the second motion operation program is in an active state.

Preferably, the first control program includes the user program including an instruction to provide the first motion operation program with a command necessary for its execution, and an instruction to provide the second motion operation program with a command necessary for its execution.

Alternatively, preferably, the second control program includes the user program including an instruction to provide the first motion operation program with a command necessary for its execution, and an instruction to provide the second motion operation program with a command necessary for its execution.

Alternatively, preferably, the user program includes a first user program including an instruction to provide the first motion operation program with a command necessary for its execution, and a second user program including an instruction to provide the second motion operation program with a command necessary for its execution. The first control program includes the first user program. The second control program includes the second user program.

According to another aspect of the present disclosure, for a CPU unit of a PLC including a microprocessor, storage means (a storage), and a communication circuit, controlling an object of control by repeating transmission of output data, reception of input data and execution of a control program producing the output data using the input data, a PLC system program stored in the storage means (storage) to be executed by the microprocessor is provided. The communication circuit transmits the output data and receives the input data in a control cycle period. The storage means (storage) is used for storing the system program and the control program. The microprocessor executes the control program in addition to the system program. The control program includes first and second control programs. The first control program includes a first motion operation program producing first motion command value data for controlling motor movement. The second control program includes a second motion operation program producing second motion command value data for controlling motor movement. At least one of the first and second control programs includes a user program created in accordance with an object of control of a user and including an instruction to provide the first and second motion operation programs with a command necessary for execution. The system program includes a first execution control instruction causing the microprocessor to start execution of the first control program at every first execution cycle of the same period as the control cycle period, and a second execution control instruction causing the microprocessor to start execution of the second control program at every second execution cycle whose period is an integral multiple of at least twice the control cycle period. The second execution control instruction includes an instruction causing the microprocessor to start, in the control cycle in which the second execution cycle starts, execution of the second control program after the end of execution of the first control program, and if the second control program is not completed before the end of the control cycle, to start execution of an unexecuted part of the second control program after the end of execution of the first control program in the next control cycle.

Preferably, the system program causes the microprocessor to execute a process for providing the output data to be transmitted with the first motion command value data updated by the execution of the first motion operation program, at each first execution cycle, while the first motion operation program is in an active state, and a process for providing the output data to be transmitted with the second motion command value data updated by the execution of the second motion operation program, at least at each second execution cycle, while the second motion operation program is in an active state.

According to still another aspect of the present disclosure, for a CPU unit of a PLC including a microprocessor, storage means (a storage), and a communication circuit, controlling an object of control by repeating transmission of output data, reception of input data and execution of a control program producing the output data using the input data, a recording medium storing a PLC system program stored in the storage means (storage) to be executed by the microprocessor is provided. The communication circuit transmits the output data and receives the input data in a control cycle period. The storage means (storage) is used for storing the system program and the control program. The microprocessor executes the control program in addition to the system program. The control program includes first and second control programs. The first control program includes a first motion operation program producing first motion command value data for controlling motor movement. The second control program includes a second motion operation program producing second motion command value data for controlling motor movement. At least one of the first and second control programs includes a user program created in accordance with an object of control of a user and including an instruction to provide the first and second motion operation programs with a command necessary for execution. The system program includes a first execution control instruction causing the microprocessor to start execution of the first control program at every first execution cycle of the same period as the control cycle period, and a second execution control instruction causing the microprocessor to start execution of the second control program at every second execution cycle whose period is an integral multiple of at least twice the control cycle period. The second execution control instruction includes an instruction causing the microprocessor to start, in the control cycle in which the second execution cycle starts, execution of the second control program after the end of execution of the first control program, and if the second control program is not completed before the end of the control cycle, to start execution of an unexecuted part of the second control program after the end of execution of the first control program in the next control cycle.

Preferably, the system program causes the microprocessor to execute a process for providing the output data to be transmitted with the first motion command value data updated by the execution of the first motion operation program, at each first execution cycle, while the first motion operation program is in an active state, and a process for providing the output data to be transmitted with the second motion command value data updated by the execution of the second motion operation program, at least at each second execution cycle, while the second motion operation program is in an active state.

According to another aspect of the disclosure a method is provided for controlling motor movement of a machine to be executed with a programmable logic controller (PLC). The method includes storing a first control program and a second control program in a storage, transmitting output data and receiving input data over a communications circuit in a control cycle period, generating a first execution control instruction causing a microprocessor to begin execution of the first control program at every first execution cycle of the same period as the control cycle period, the first control program producing a first motion command value data for controlling motor movement, and generating a second execution control instruction causing the microprocessor to begin execution of the second control program at every second execution cycle whose period is an integral multiple of at least twice the control cycle period, the second control program producing a second motion command value data for controlling motor movement. The second control instruction includes an instruction causing the microprocessor to begin, in a control cycle in which the second execution begins, execution of the second control program after an end of execution of the first control program. Further, the second control program is not completed before the end of the control cycle, to being execution of an unexecuted portion of the second control program after the end of execution of the first control program in the next control cycle.

According to a further aspect of the disclosure, the method may include providing the output data to be transmitted with a first motion command value data, at each first execution cycle, while the first motion operation program is in an active state, and providing the output data to be transmitted with the second motion command value data, at least at each second execution cycle, while the second motion operation program is in an active state.

According to another aspect of the disclosure, a non-transitory computer readable medium is providing for storing a program that allows a computer apparatus to perform a process for controlling motor movement of a machine. The program allows the computer apparatus to perform storing a first control program and a second control program in a storage, transmitting output data and receiving input data over a communications circuit in a control cycle period, generating a first execution control instruction causing a microprocessor to begin execution of the first control program at every first execution cycle of the same period as the control cycle period, the first control program producing a first motion command value data for controlling motor movement, and generating a second execution control instruction causing the microprocessor to begin execution of the second control program at every second execution cycle whose period is an integral multiple of at least twice the control cycle period, the second control program producing a second motion command value data for controlling motor movement. The second control instruction includes an instruction causing the microprocessor to begin, in a control cycle in which the second execution begins, execution of the second control program after an end of execution of the first control program. The second control program is not completed before the end of the control cycle, to being execution of an unexecuted portion of the second control program after the end of execution of the first control program in the next control cycle.

According to a further aspect of the disclosure, the program may allow the computer to perform providing the output data to be transmitted with a first motion command value data, at each first execution cycle, while the first motion operation program is in an active state, and providing the output data to be transmitted with the second motion command value data, at least at each second execution cycle, while the second motion operation program is in an active state.

As used herein, the term "instruction" or "instructions" means not only an individual instruction or instructions appearing in program source lists, but also a set of individual instructions, functions, etc.

EFFECTS OF THE DISCLOSURE

According to the present disclosure, in a PLC having a motion control function, while execution cycles having a relatively short period for some motion control processes requiring high-speed processing are provided, other motion control processes can be executed in cycles having a fixed period.

DETAILED DESCRIPTION

Figure 1:
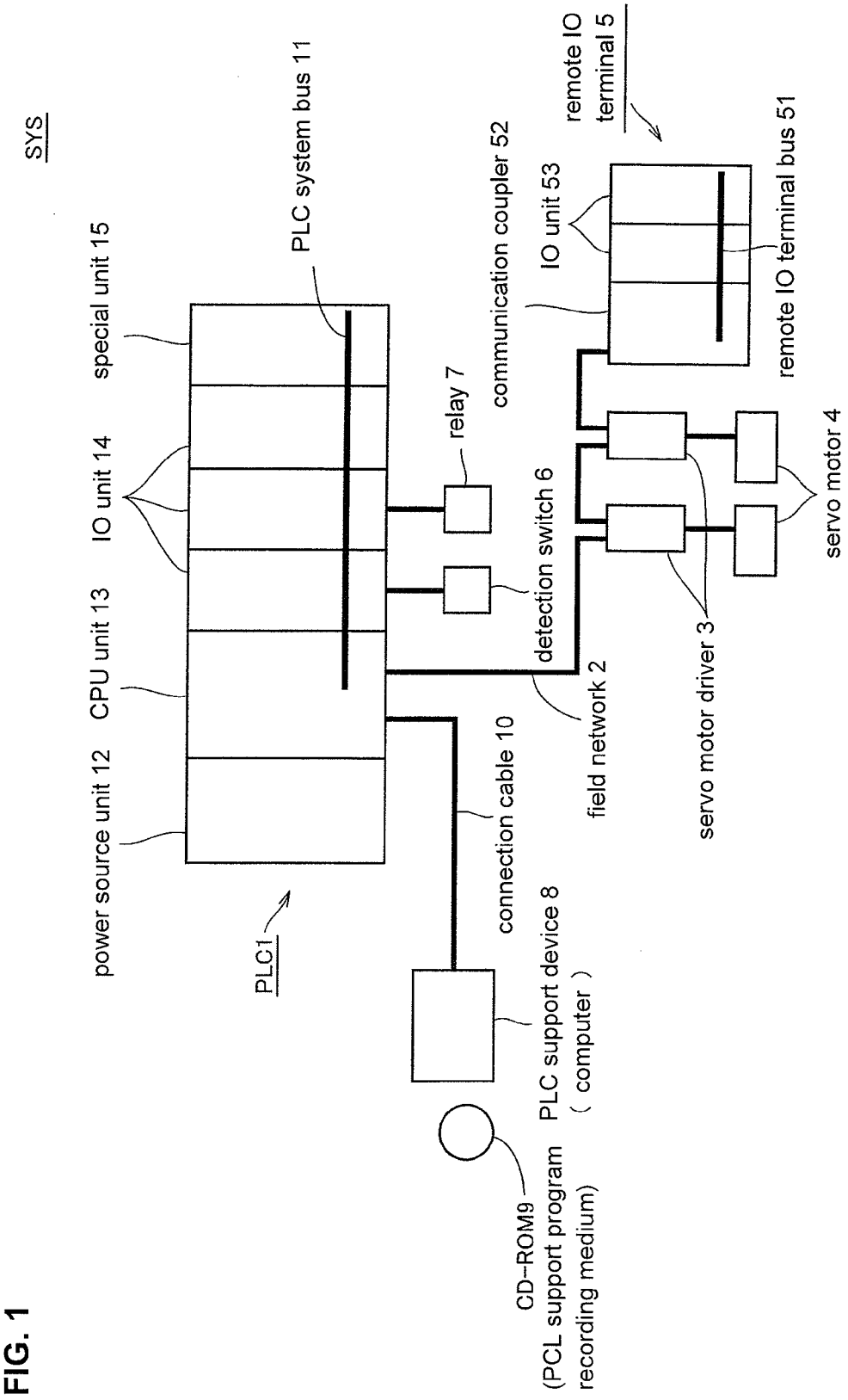
FIG. 1 is a schematic diagram showing a general configuration of a PLC system according to an embodiment of the present disclosure.

Embodiments of the present disclosure will be described in detail with reference to the accompanying drawings. Note that the same or equivalent parts are indicated by the same reference characters and will not be redundantly described.

<A. System Configuration>

A PLC according to this embodiment has a motion control function for controlling a motor movement. Firstly, a system configuration of the PLC 1 of this embodiment will be described with reference to FIG. 1.

FIG. 1 is a schematic diagram showing a general configuration of the PLC system of this embodiment of the present disclosure. Referring to FIG. 1, the PLC system SYS includes the PLC 1, servo motor drivers 3 and a remote IO terminal 5 which are connected to the PLC 1 via a field network 2, and a detection switch 6 and a relay 7 which are field devices. A PLC support device 8 is also connected to the PLC 1 via a connection cable 10 or the like.

The PLC 1 includes a CPU unit 13 which executes a main operation process, one or more IO units 14, and a special unit 15. These units are configured to exchange data via a PLC system bus 11. Power of an appropriate voltage is supplied to these units by a power supply unit 12. Note that the units constituting the PLC 1 are provided by a PLC manufacturer, and therefore, typically, the PLC system bus 11 is developed and used independently by each PLC manufacturer. In contrast to this, as described below, for the field network 2, a standard or the like are often published so that products available from different manufacturers can be connected via the field network 2.

Figure 2:
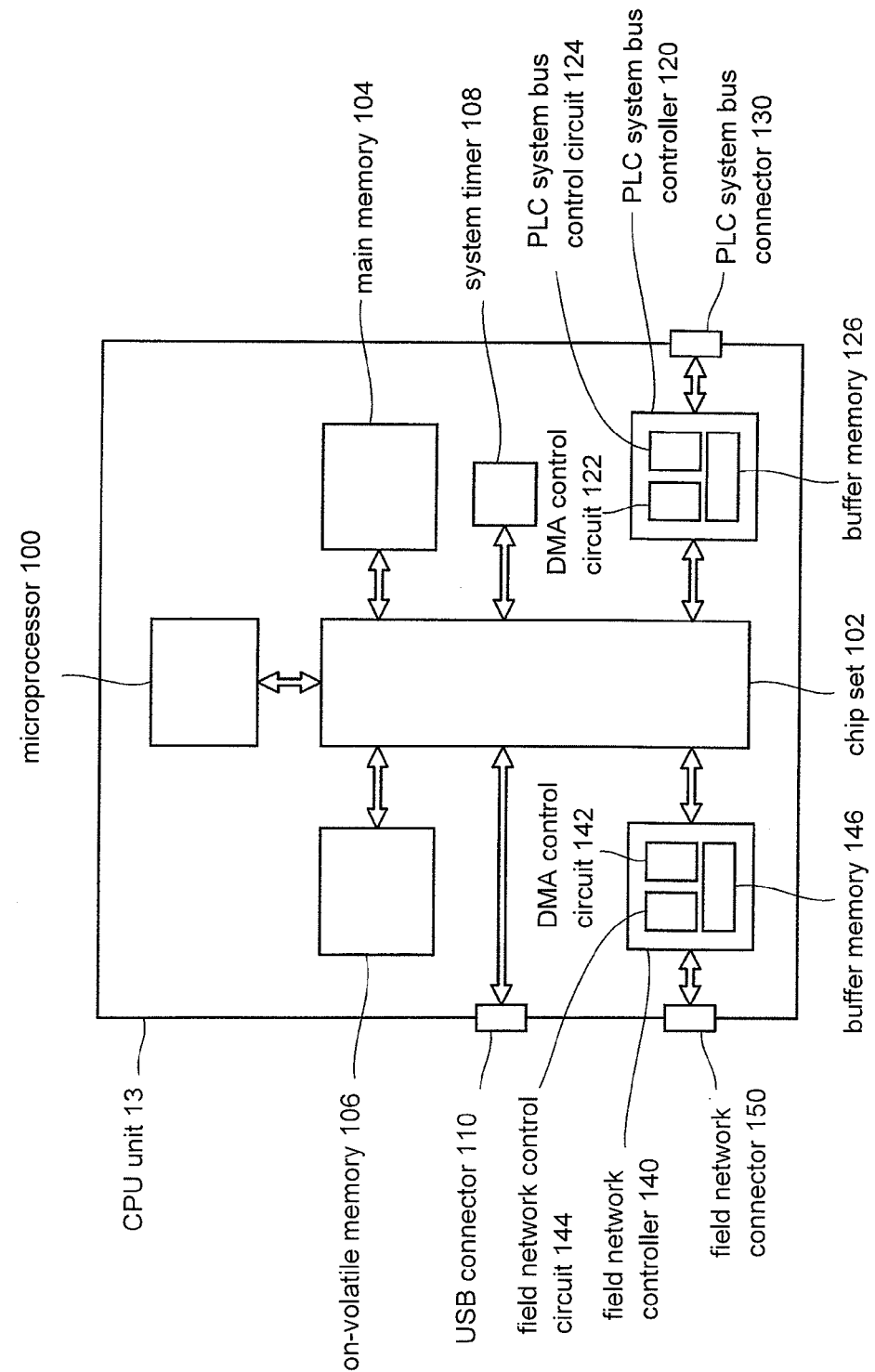
FIG. 2 is a schematic diagram showing a hardware configuration of a CPU unit according to the embodiment of the present disclosure.

Details of the CPU unit 13 will be described below with reference to FIG. 2. The CPU unit 13 mainly controls an object of control, such as a motor etc.

The IO units 14 are units which are related to a general input/output process and are used to input and output binary data (on and off). Specifically, the IO units 14 collect information indicating whether a sensor, such as the detection switch 6 etc., is in a state (on) in which the sensor has detected any object or in a state (off) in which the sensor has detected no object. The IO units 14 also have a function of outputting a command (on) for activation and a command (off) for inactivation to an output destination, such as the relay 7 or an actuator.

The special unit 15 has functions which are not supported by the IO unit 14, including inputting and outputting of analog data, control of temperature, and communication using a specific communication scheme.

The field network 2 transmits various kinds of data which are exchanged with the CPU unit 13. As the field network 2, typically, various kinds of industrial Ethernet (registered trademark) are available. Examples of industrial Ethernet (registered trademark) includes EtherCAT (registered trademark), Profinet IRT, MECHATROLINK (registered trademark)-III, Powerlink, SERCOS (registered trademark)-III, CIP Motion, etc. Any of these Ethernet technologies may be employed. Field networks other than industrial Ethernet (registered trademark) may be employed. For example, unless motion control is performed, DeviceNet, CompoNet/IP (registered trademark), etc. may be employed. In the PLC system SYS of this embodiment, typically, in this embodiment, a configuration will be illustrated in which EtherCAT (registered trademark), which is a type of industrial Ethernet (registered trademark), is employed as the field network 2.

Although FIG. 1 illustrates a PLC system SYS that has both a PLC system bus 11 and a field network 2, a system configuration which has only one of them may be employed. For example, all units may be connected together via the field network 2. Alternatively, the servo motor driver 3 may be connected directly to the PLC system bus 11 without using the field network 2. Moreover, a communication unit of the field network 2 may be connected to the PLC system bus 11, and the CPU unit 13 may communicate with devices connected to the field network 2 via the communication unit.

Note that if the CPU unit 13 has the function of the IO units 14 and the functions of the servo motor driver 3, the PLC 1 may be configured so that the CPU unit 13 directly controls an object of control without using the IO units 14, the servo motor drivers 3, or the like.

The servo motor drivers 3 are connected via the field network 2 to the CPU unit 13, and drive the servo motors 4 based on a command value from the CPU unit 13. More specifically, the servo motor drivers 3 receive command values, such as a position command value, a speed command value, and a torque command value, from the PLC 1 at predetermined intervals. The servo motor drivers 3 also acquire measured values related to an operation of the servo motors 4, such as a position, a speed (typically, calculated from the difference between the current position and the previous position), and a torque, from detectors, such as a position sensor (rotary encoder) and a torque sensor, which are connected to the shafts of the servo motors 4. Thereafter, the servo motor drivers 3 perform a feedback control, where the target values are the command values from the CPU unit 13, and the feedback values are the measured values. In other words, the servo motor drivers 3 adjust a current for driving the servo motors 4 so that the measured values approach the target values. Note that the servo motor drivers 3 may also be called "servo motor amplifiers".

While FIG. 1 shows an example system in which servo motors 4 are combined with servo motor drivers 3, other configurations may be employed. For example, a system in which pulse motors is combined with pulse motor drivers may be employed.

A remote IO terminal 5 is also connected to the field network 2 of the PLC system SYS of FIG. 1. The remote IO terminal 5 normally performs a process which is related to a general input/output process, as with the IO unit 14. More specifically, the remote IO terminal 5 includes a communication coupler 52 for performing a process which is related to data transmission on the field network 2, and one or more IO units 53. These units are configured to exchange data with each other via a remote IO terminal bus 51.

The PLC support device 8 will be described below.

<B. Hardware Configuration of CPU Unit>

Next, a hardware configuration of the CPU unit 13 will be described with reference to FIG. 2. FIG. 2 is a schematic diagram showing the hardware configuration of the CPU unit 13 of this embodiment of the present disclosure. Referring to FIG. 2, the CPU unit 13 includes a microprocessor 100, a chip set 102, a main memory 104, a non-volatile memory 106, a system timer 108, a PLC system bus controller 120, a field network controller 140, and a USB connector 110. The chip set 102 and other components are linked together via various buses.

The microprocessor 100 and the chip set 102 are typically configured under a general-purpose computer architecture. Specifically, the microprocessor 100 interprets and executes command codes which are successively supplied from the chip set 102 based on an internal clock. The chip set 102 exchanges internal data with various components connected thereto, and produces command codes which are required by the microprocessor 100. The chip set 102 also has a function of caching, for example, data obtained as a result of execution of an operation process in the microprocessor 100.

The CPU unit 13 has, as storage means (a storage), the main memory 104 and the non-volatile memory 106.

The main memory 104, which is a volatile storage area (RAM), holds various programs which are to be executed by the microprocessor 100 after the CPU unit 13 is powered on. The main memory 104 is also used as a working memory during execution of various programs by the microprocessor 100. Examples of the main memory 104 include DRAM (Dynamic Random Access Memory) devices and SRAM (Static Random Access Memory) devices.

On the other hand, the non-volatile memory 106 holds, in a non-volatile manner, data such as a real-time OS (Operating System), a system program of the PLC 1, a user program, a motion operation program, a system set parameter, etc. These programs and data are copied to the main memory 104 as required so that the microprocessor 100 can access them. As the non-volatile memory 106, a semiconductor memory such as a flash memory may be employed. Alternatively, for example, magnetic recording media (e.g., a hard disk drive etc.) and optical recording media (e.g., DVD-RAM (Digital Versatile Disk Random Access Memory) etc.) may be employed.

The system timer 108 produces and provides an interrupt signal to the microprocessor 100 at predetermined intervals. Typically, based on hardware specifications, the system timer 108 is configured to produce different interrupt signals at different intervals. Alternatively, the system timer 108 may be set by an OS (Operating System) or a BIOS (Basic Input Output System) etc. to produce interrupt signals at suitable intervals. By using the interrupt signal produced by the system timer 108, a control operation is achieved which is performed at each control cycle as described below.

The CPU unit 13 has, as the communication circuit, a PLC system bus controller 120 and a field network controller 140. These communication circuits transmit output data and receive input data.

Note that if the CPU unit 13 itself has the function of the IO unit 14 and the servo motor driver 3, the communication circuit transmits output data and receives input data to and from portions of the CPU unit 13 which carry out these functions, inside the CPU unit 13.

The PLC system bus controller 120 controls data exchange which is performed via the PLC system bus 11. More specifically, the PLC system bus controller 120 includes a DMA (Dynamic Memory Access) control circuit 122, a PLC system bus control circuit 124, and a buffer memory 126. Note that the PLC system bus controller 120 is internally connected via a PLC system bus connector 130 to the PLC system bus 11.

The buffer memory 126 functions as a transmission buffer for data (also hereinafter referred to as "output data") which is output via the PLC system bus 11 to other units, and as a reception buffer for data (also hereinafter referred to as "input data") which is input via the PLC system bus 11 from other units. Note that output data produced by an operation process of the microprocessor 100 is initially stored in the main memory 104. Thereafter, output data to be transferred to a specific unit is read out from the main memory 104 and temporarily held in the buffer memory 126. Input data transferred from other units is temporarily held in the buffer memory 126 before being transferred to the main memory 104.

The DMA control circuit 122 transfers output data from the main memory 104 to the buffer memory 126 and input data from the buffer memory 126 to the main memory 104.

The PLC system bus control circuit 124 performs a process for transmitting output data of the buffer memory 126 to other units connected to the PLC system bus 11, and a process of receiving input data from other units connected to the PLC system bus 11 and storing the input data into the buffer memory 126. Typically, the PLC system bus control circuit 124 provides the functions of a physical layer and a data link layer of the PLC system bus 11.

The field network controller 140 controls data exchange performed via the field network 2. Specifically, the field network controller 140 controls output data transmission and input data reception based on the standard for the field network 2. As described above, in this embodiment, the field network 2 conforming to the EtherCAT (registered trademark) standard is employed, and therefore, the field network controller 140 including hardware for performing typical Ethernet (registered trademark) communication is employed. In the EtherCAT (registered trademark) standard, a typical Ethernet (registered trademark) controller which employs a communication protocol for the typical Ethernet (registered trademark) standard is available. Note that, for some types of industrial Ethernet (registered trademark) employed as a field network 2, an Ethernet (registered trademark) controller having special specifications which corresponds to a communication protocol having dedicated specifications different from those of a typical communication protocol is employed. If a field network other than industrial Ethernet (registered trademark) is employed, a dedicated field network controller corresponding to the standard is employed.

The buffer memory 146 functions as a transmission buffer for data (also hereinafter referred to as "output data") which is output via the field network 2 to other devices etc. and as a reception buffer for data (also hereinafter referred to as "input data") which is input via the field network 2 from other devices etc. As described above, output data produced by an operation process of the microprocessor 100 is initially stored in the main memory 104. Thereafter, output data which is to be transferred to a specific device is read out from the main memory 104 and temporarily held in the buffer memory 146. Input data transferred from other devices is temporarily held in the buffer memory 146 before being transferred to the main memory 104.

A DMA control circuit 142 transfers output data from the main memory 104 to the buffer memory 146, and input data from the buffer memory 146 to the main memory 104.

A field network control circuit 144 performs a process of transmitting output data of the buffer memory 146 to other devices connected to the field network 2, and a process of receiving from other devices connected to the field network 2 and storing input data into the buffer memory 146. Typically, the field network control circuit 144 provides the functions of a physical layer and a data link layer of the field network 2.

The USB connector 110 is an interface for connecting the PLC support device 8 and the CPU unit 13 together. Typically, for example, a program executable by the microprocessor 100 in the CPU unit 13, which is transferred from the PLC support device 8, is input via the USB connector 110 to the PLC 1.

<C. Software Configuration of CPU Unit>

Next, pieces of software for providing various functions according to this embodiment will be described with reference to FIG. 3. Command codes contained in these pieces of software are read out with appropriate timing and executed by the microprocessor 100 of the CPU unit 13.

Figure 3:
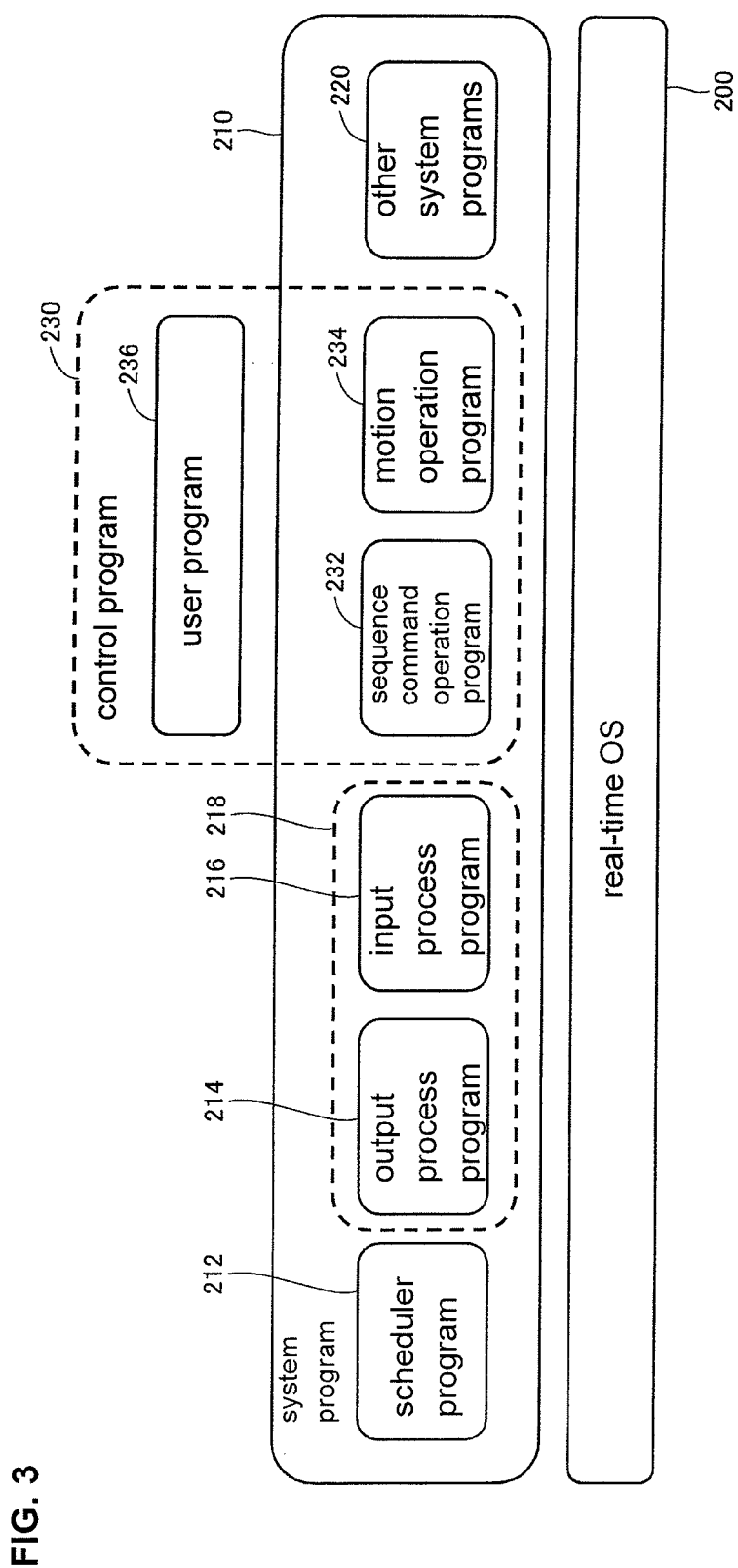
FIG. 3 is a schematic diagram showing a software configuration which is executed by the CPU unit according to the embodiment of the present disclosure.

FIG. 3 is a schematic diagram showing a software configuration which is executed by the CPU unit 13 according to this embodiment of the present disclosure. Referring to FIG. 3, software executable by the CPU unit 13 has a three-layer structure including a real-time OS 200, a system program 210, and a user program 236.

The real-time OS 200 is designed based on the computer architecture of the CPU unit 13. The microprocessor 100 provides a basic execution environment for executing the system program 210 and the user program 236. The real-time OS is typically available from a PLC manufacturer or a specialized software company, etc.

The system program 210 includes pieces of software for providing functions of the PLC 1. Specifically, the system program 210 includes a scheduler program 212, an output process program 214, an input process program 216, a sequence command operation program 232, a motion operation program 234, and other system programs 220. Note that, typically, the output process program 214 and the input process program 216 are continuously (integrally) executed, and therefore, may also be collectively referred to as an IO process program 218.

The user program 236 is produced based on the user's purpose of control. In other words, the user program 236 is suitably designed based on a line (process) to be controlled using the PLC system SYS.

As described below, the user program 236 achieves the user's control purpose in cooperation with the sequence command operation program 232 and the motion operation program 234. Specifically, the user program 236 achieves a programmed operation by using a command, a function, a functional module, or the like which are provided by the sequence command operation program 232 and the motion operation program 234. Therefore, the user program 236, the sequence command operation program 232, and the motion operation program 234 may also be collectively referred to as a control program 230. In particular, the user program 236 and the motion operation program 234 which share execution cycles may be regarded as a single control program 230.

Thus, the microprocessor 100 of the CPU unit 13 executes the system program 210 and the control program 230 which are stored in the storage means (storage). In other words, the storage means (storage) is used to store at least a system program and a control program.

Each program will be described in greater detail hereinafter.

As described above, the user program 236 is produced based on the user's purpose of control (e.g., a line or process to be controlled). The user program 236 is typically in the form of an object program executable by the microprocessor 100 of the CPU unit 13. The user program 236 is produced by a source program written in ladder logic or the like and compiled by the PLC support device 8 etc. Thereafter, the user program 236 thus produced in the form of an object program is transferred from the PLC support device 8 via the connection cable 10 to the CPU unit 13, and stored into the non-volatile memory 106, for example.

The scheduler program 212 controls the start of a process and the restart of the process after interruption, in each execution cycle, for the output process program 214, the input process program 216, and the control program 230. More specifically, the scheduler program 212 controls execution of the user program 236 and the motion operation program 234.

In the CPU unit 13 of this embodiment, an execution cycle (control cycle) having a fixed period which is suited to the motion operation program 234 is used as a common cycle for all processes. Therefore, it is difficult to complete all processes during one control cycle. Therefore, the processes are divided into processes which need to be completely executed during each control cycle and processes which are allowed to be executed over a plurality of control cycles, according to, for example, the priority level of the process to be executed. The scheduler program 212 manages, for example, the order of execution of the divided processes. More specifically, the scheduler program 212 executes a program to which a higher priority level is given, earlier during each control cycle period.

The output process program 214 rearranges output data produced by execution by the user program 236 (the control program 230) into a format which is suitable for transmission to the PLC system bus controller 120 and/or the field network controller 140. When the PLC system bus controller 120 or the field network controller 140 requires a transmission execution instruction from the microprocessor 100, the output process program 214 issues the instruction.

The input process program 216 rearranges input data which has been received by the PLC system bus controller 120 and/or the field network controller 140 into a format which is suitable for use in the control program 230.

When a sequence command which is used in the user program 236 is executed, the sequence command operation program 232 is called and executed to accomplish a task requested by the command.

The motion operation program 234 is executed based on an instruction from the user program 236, and in each execution, calculates a command value which is output to a motor driver, such as one of the servo motor drivers 3 or a pulse motor driver.

The other system programs 220 collectively indicate programs for achieving functions of the PLC 1 other than the individual programs separately shown in FIG. 3. The other system programs 220 include a program which sets the period of a control cycle.

The control cycle period can be appropriately set based on an object of control. Typically, the user inputs information specifying the control cycle period to the PLC support device 8. Thereafter, the input information is transferred from the PLC support device 8 to the CPU unit 13. The program which sets the control cycle period stores the information from the PLC support device 8 into the non-volatile memory 106, and sets the system timer 108 so that an interrupt signal is generated at intervals equal to the control cycle period specified by the system timer 108. When the CPU unit 13 is powered on, the program which sets the control cycle period is executed, so that the information specifying the control cycle period is read from the non-volatile memory 106, and the system timer 108 is set based on the read information.

The information specifying the control cycle period may be in the form of a value of a time indicating the control cycle period, information (numbers and/or characters) specifying one of a plurality of previously prepared options related to the control cycle period, etc.

In the CPU unit 13 of this embodiment, means for setting (a setter) the control cycle period corresponds to the following elements which are used to suitably set the control cycle period: means for communicating (a communicator) with the PLC support device 8 in order to obtain the information specifying the control cycle period; a program which sets the control cycle period; and a configuration of the system timer 108 which is configured to suitably set intervals in which an interrupt signal specifying the control cycle is generated.

The real-time OS 200 provides an environment for changing a plurality of programs over time. In the PLC 1 of this embodiment, an interrupt for starting a control cycle is initially set as an event (interrupt) for outputting (transmitting) output data produced by execution of a program performed by the CPU unit 13 to another unit or device. When an interrupt for starting a control cycle occurs, the real-time OS 200 switches a target executed by the microprocessor 100 from a program which is being executed upon the occurrence of the interrupt to the scheduler program 212. Note that when none of the scheduler program 212 and the programs of which execution is controlled by the scheduler program 212 is being executed, the real-time OS 200 executes a program included in the other system programs 220. Such a program may be, for example, a program which is related to a communication process performed between the CPU unit 13 and the PLC support device 8 via the connection cable 10 (USB) or the like.

Using the above interrupt, the CPU unit 13 of the PLC 1 is configured to control an object of control by repeating transmission of output data, reception of input data, and execution of the control program producing the output data using the input data. In this case, the PLC system bus controller 120 and the field network controller 140 (communication circuit) transmit output data and receive input data at intervals equal to the control cycle period.

Note that a method for providing a communication trigger signal which is used to determine a timing of reception of input data may be typically implemented as follows.

(1) Configuration in which the microprocessor 100 issues the communication trigger signal every time the communication circuit executes communication.

(2) Configuration in which the communication circuit receives the communication trigger signal directly from the system timer 108.

(3) Configuration in which the communication circuit includes a timer circuit which generates the communication trigger signal.

In any of these cases, the communication trigger signal is generated at intervals equal to the control cycle period.

<D. Main Memory Configuration>

Next, storage areas provided in the main memory 104 of the CPU unit 13 will be described with reference to FIG. 4.

Figure 4:
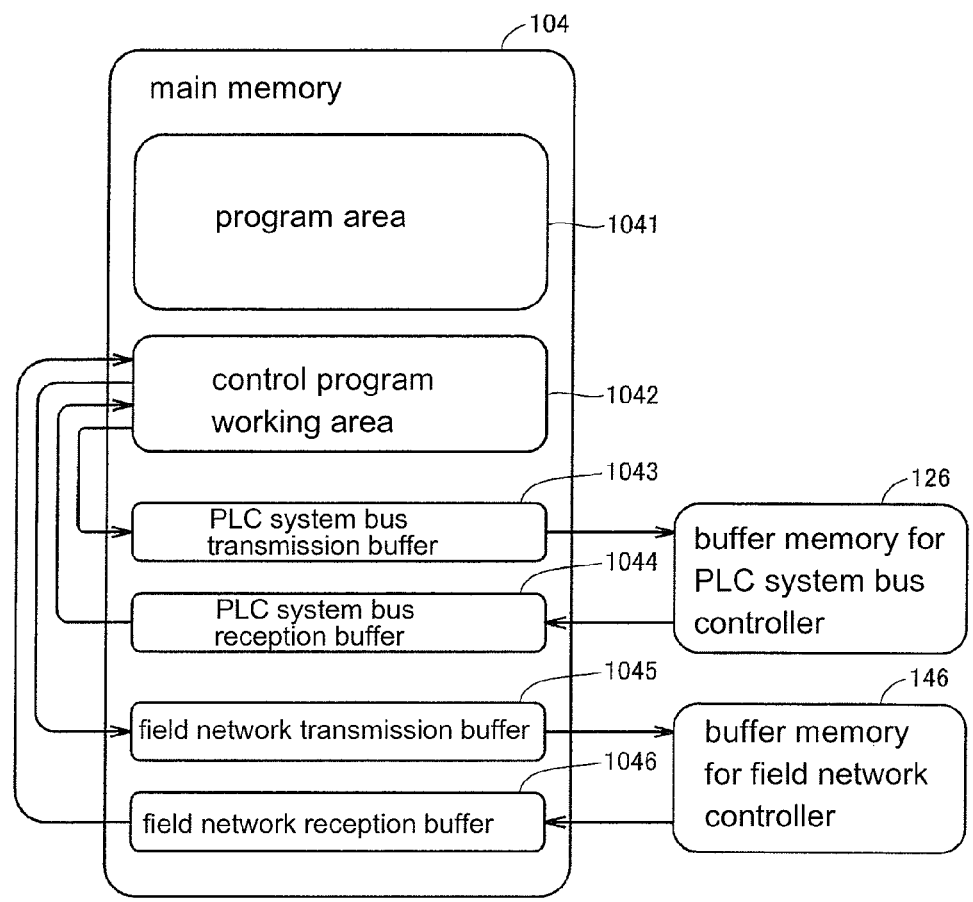
FIG. 4 is a schematic diagram showing an area configuration of a main memory of the CPU unit according to the embodiment of the present disclosure.

FIG. 4 is a schematic diagram showing an area configuration of the main memory 104 of the CPU unit 13 according to an embodiment of the present disclosure. Referring to FIG. 4, a program area 1041, a working area 1042 for a control program, a PLC system bus transmission buffer 1043, a PLC system bus reception buffer 1044, a field network transmission buffer 1045, and a field network reception buffer 1046 are formed in the main memory 104.

The program area 1041 is used to temporarily store code for executing various programs.

The control program working area 1042 is used to temporarily store output data produced by execution of the control program 230.

The PLC system bus transmission buffer 1043 and the PLC system bus reception buffer 1044 are used to temporarily store data transmitted and received, respectively, via the PLC system bus 11. Similarly, the field network transmission buffer 1045 and the field network reception buffer 1046 are used to temporarily store data transmitted and received, respectively, via the field network 2.

More specifically, when any output data needs to be transmitted via the PLC system bus 11, the output process program 21 copies the output data to be transmitted, from the control program working area 1042 to the PLC system bus transmission buffer 1043. In this case, in the PLC system bus transmission buffer 1043, the output process program 214 rearranges a plurality of portions of output data into groups so that portions of output data belonging to the same group can be transmitted to the same unit.

Similarly, when any output data needs to be transmitted via the field network 2, the output process program 214 copies the output data to be transmitted, from the control program working area 1042 to the field network transmission buffer 1045. In this case, in the field network transmission buffer 1045, the output process program 214 rearranges the output data into a format in which the output data can be transmitted as serial frames.

On the other hand, the input process program 216 copies input data which has been received by the PLC system bus controller 120 and stored in the PLC system bus reception buffer 1044, and/or input data which has been received by the field network controller 140 and stored in the field network reception buffer 1046, to the control program working area 1042. In this case, in the control program working area 1042, the input process program 216 rearranges the input data into a format which is suitable to be used by the control program 230.

The DMA control circuit 122 of the PLC system bus controller 120 transfers output data stored in the PLC system bus transmission buffer 1043 to the buffer memory 146 of the PLC system bus controller 120, and input data stored in the buffer memory 146 to the PLC system bus reception buffer 1044.

The DMA control circuit 142 of the field network controller 140 transfers output data stored in the field network transmission buffer 1045 to the buffer memory 146 of the field network controller 140, and input data stored in the buffer memory 146 to the field network reception buffer 1046.

The control program working area 1042, the PLC system bus transmission buffer 1043, the PLC system bus reception buffer 1044, the field network transmission buffer 1045, and the field network reception buffer 1046 are configured so that access thereto can be controlled independently of each other. Therefore, for example, a plurality of operations (1)-(3) described hereinafter can be executed in parallel.

(1) Access to the control program working area 1042 which is performed by the microprocessor 100 executing the user program 236.

(2) Access to the PLC system bus transmission buffer 1043 and/or the PLC system bus reception buffer 1044 in the main memory 104 which is performed by the DMA control circuit 122 of the PLC system bus controller 120, in order to transfer data between the PLC system bus transmission buffer 1043 and/or the PLC system bus reception buffer 1044 in the main memory 104, and the buffer memory 126 in the PLC system bus controller 120.

(3) Access to the field network transmission buffer 1045 and/or the field network reception buffer 1046 in the main memory 104 which is performed by the DMA control circuit 142 of the field network controller 140, in order to transfer data between the field network transmission buffer 1045 and/or the field network reception buffer 1046 in the main memory 104, and the buffer memory 146 in the field network controller 140.

<E. General Procedure of Motion Control>

Next, a general procedure of a motion control provided by the PLC system SYS of this embodiment.

First, a typical configuration of the user program 236 will be described. The user program 236 includes an instruction to periodically determine whether or not a condition for starting a control related to a motor movement is satisfied. For example, this may be a logic to determine whether or not a workpiece to be subjected to any treatment by the drive force of the motor has been transported to a predetermined treatment position. The user program 236 also includes an instruction to start a motion control in response to determination that the control start condition is satisfied. When the motion control is started, execution of a motion command is instructed. As a result, the motion operation program 234 corresponding to the instructed motion command is started up to first execute an initial process necessary for calculation of a command value for a motor in each execution of the motion operation program 234. Also, in the same control cycle in which the initial process has been executed, a command value for the first cycle is calculated. Therefore, the initial process and the first command value calculation process are to be performed by the started motion operation program 234 in the first execution. Thereafter, command values are successively calculated in respective cycles.

Figure 5:
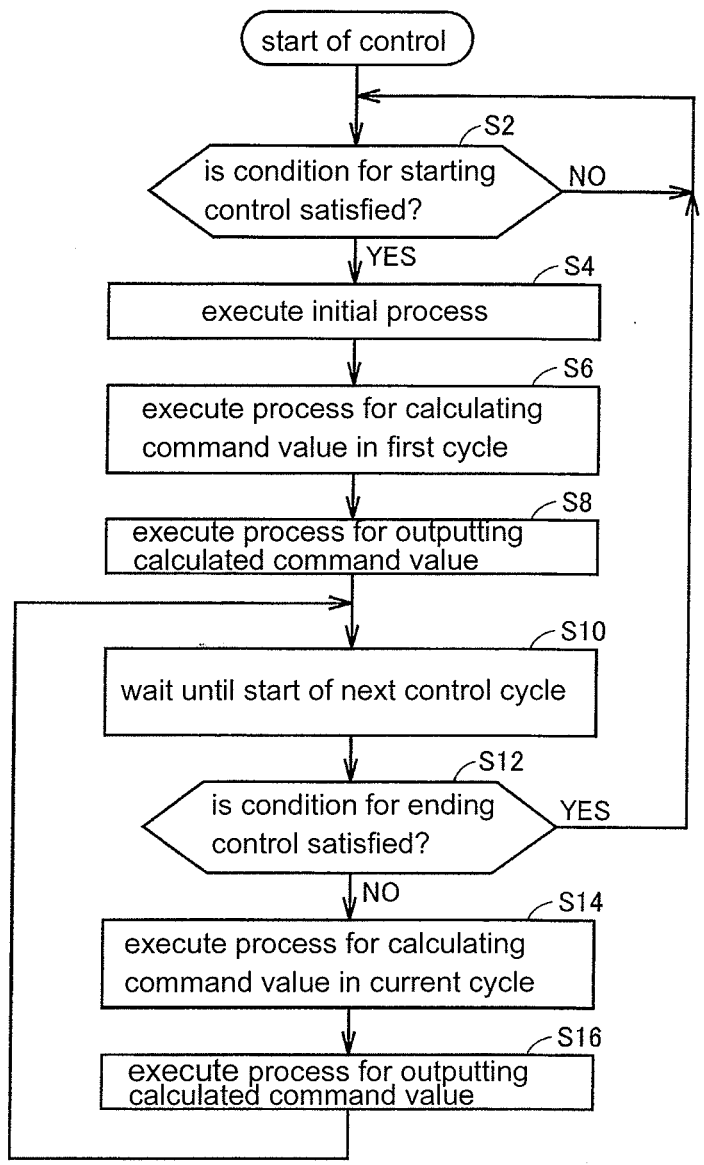
FIG. 5 is a flowchart showing a general procedure of a motion control provided by a control program according to the embodiment of the present disclosure.

FIG. 5 is a flowchart showing a general procedure of a motion control provided by the control program 230 (the user program 236, the sequence command operation program 232, and the motion operation program 234) according to this embodiment of the present disclosure. Referring to FIG. 5, the microprocessor 100 periodically determines whether or not the control start condition related to motor movement is satisfied (step S2). The determination of whether or not the control start condition is satisfied is realized by the user program 236 and the sequence command operation program 232. If the control start condition is not satisfied (NO in step S2), the determination of step S2 is repeated.

If the control start condition is satisfied (YES in step S2), the microprocessor 100 executes an initial process related to a motion control (step S4). The initial process includes processes for calculating start position coordinates, end position coordinates, an initial speed, an initial acceleration, and a path, etc. of motor movement. Following this, the microprocessor 100 executes a process for calculating a command value in the first cycle (step S6). The microprocessor 100 also executes a process for outputting the calculated command value (step S8).

Thereafter, the microprocessor 100 waits for the start of the next control cycle (step S10). The microprocessor 100 periodically determines whether or not a condition for ending the control related to motor movement is satisfied (step S12). The control end condition is satisfied if, for example, the servo motor 4 has reached the end position. If the control end condition is satisfied (YES in step S12), step S2 and the following steps are repeated. In this case, the motion operation program 234 which has been started up is maintained in an inactive state until the control start condition is newly satisfied.

If the control end condition is not satisfied (NO in step S12), the microprocessor 100 executes a process for calculating a command value in the current cycle (step S14). The microprocessor 100 also executes a process for outputting the calculated command value (step S16). Thereafter, step S10 and the following steps are repeated.

In the flowchart of FIG. 5, the period of time from when the control start condition is satisfied (YES in step S2) to when the control end condition is satisfied (YES in step S12) corresponds to that for which the motion operation program 234 is in an "active" state.

In the process for outputting the calculated command value (steps S8 and S16), the calculated command value is copied from the control program working area 1042 of FIG. 4 to the PLC system bus transmission buffer 1043 or the field network transmission buffer 1045. Thereafter, the copied command value is transmitted as updated motion command value data at the next transmission timing.

Note that the motion command value data stored in the transmission buffer (the PLC system bus transmission buffer 1043 or the field network transmission buffer 1045) may be transmitted at each control cycle irrespective of whether or not the motion command value data has been updated. Alternatively, the motion command value data may be transmitted only when the motion command value data has been updated.

Thus, the system program 210 of this embodiment causes the microprocessor 100 to execute a process for providing output data to be transmitted with the motion command value data updated by execution of a first motion operation program, at each execution cycle, while the first motion operation program is in an active state.

As described below, when a plurality of control programs each including a motion operation program are executed, such a process is independently executed in each motion operation program in the corresponding execution cycle. Specifically, the system program 210 of this embodiment causes the microprocessor 100 to execute a process for providing output data to be transmitted with first motion command value data updated by execution of a first motion operation program, at each first execution cycle, while the first motion operation program is in an active state, and a process for providing output data to be transmitted with second motion command value data updated by execution of a second motion operation program, at each second execution cycle, while the second motion operation program is in an active state.

<F. Overall Process Operation>

Next, the order of execution of the programs of this embodiment, etc. will be described.

Figure 6:
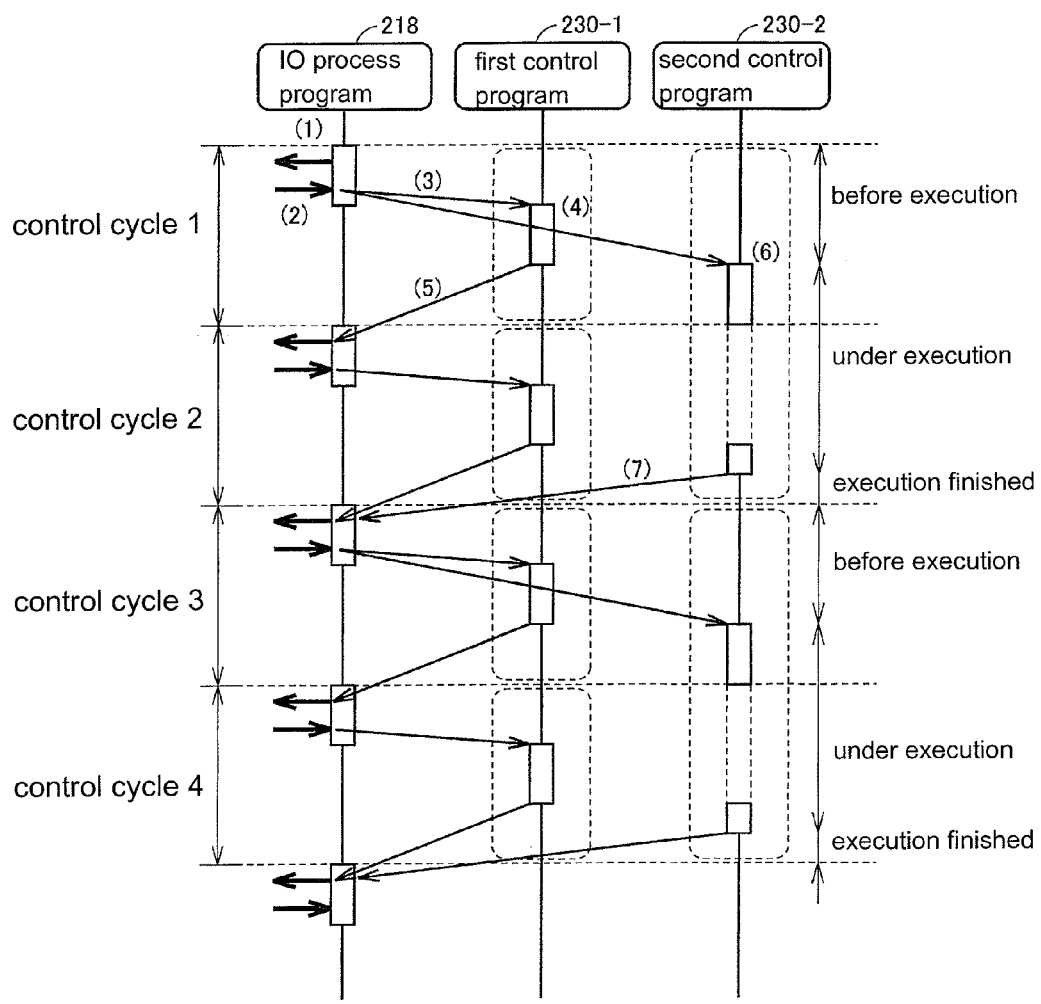
FIG. 6 is a sequence diagram showing an overall process operation according to the embodiment of the present disclosure.

FIG. 6 is a sequence diagram showing an overall process operation according to this embodiment of the present disclosure. FIG. 6 refers to a case where, in the execution of the PLC 1 of this embodiment, the microprocessor 100 executes a plurality of control programs (a first control program 230-1 and a second control program 230-2). At that time, the microprocessor 100 also executes the IO process program 218 (the output process program 214 and the input process program 216) in a time-division manner.

Typically, it is assumed that the first control program 230-1 and the second control program 230-2 include a first motion operation program 234-1 and a second motion operation program 234-2. It is also assumed that at least one of the first control program 230-1 and the second control program 230-2 further includes the user program 236.

Rectangles with rounded corners indicated by dashed lines along the time axes of the first and second control programs of FIG. 6 indicate corresponding control program execution cycles. For example, one execution cycle of the first control program 230-1 corresponds to one control cycle, and one execution cycle of the second control program 230-2 corresponds to two control cycles.

In FIG. 6, arrows extending from the IO process program 218 to the first control program 230-1 and the second control program 230-2, respectively, indicate flows of input data. Specifically, the arrows correspond to copying of input data from the reception buffer (the field network transmission buffer 1045 and/or the field network reception buffer 1046) to the control program working area 1042. If the control program 230 (the first control program 230-1 and/or the second control program 230-2) includes the user program 236, the input data may include input data used by the user program 236 and, in addition, input data used by the motion operation program 234 (the motion operation program 234 may execute an operation without using input data).

Similarly, in FIG. 6, arrows extending from the first control program 230-1 and the second control program 230-2, respectively, to the IO process program indicate flows of output data. Specifically, the arrows correspond to copying of output data from the control program working area 1042 to the transmission buffer (the PLC system bus transmission buffer 1043 and/or the field network transmission buffer 1045). When the control program 230 (the first control program 230-1 and/or the second control program 230-2) includes the user program 236, the output data may include output data produced by the user program 236 and, in addition, motion command value data produced by the motion operation program 234 while the motion operation program 234 is in the active state.

A sequence in execution of the PLC 1 of FIG. 6 is described as follows.

(1) In response to an instruction of the IO process program 218, an output process is executed. More specifically, output data which has been stored in the transmission buffer (the PLC system bus transmission buffer 1043 and/or the field network transmission buffer 1045) by the previous process is transmitted to other units or devices.

(2) The field network controller 140 receives input data and stores the input data into the field network reception buffer 1046, and/or the PLC system bus controller 120 receives input data and stores the input data into the PLC system bus reception buffer 1044.

(3) In response to an instruction from the IO process program 218, input data stored in the PLC system bus reception buffer 1044 and/or the field network reception buffer 1046 is transferred to the control program working area 1042.

(4) In response to an instruction from the first control program 230-1, various processes are executed using the input data to calculate output data, and the calculated output data is stored into the control program working area 1042.

(5) In response to an instruction from the IO process program 218, the output data stored in the control program working area 1042 is transferred to the PLC system bus transmission buffer 1043 and/or the field network transmission buffer 1045.

(6) In response to a command from the second control program 230-2, various processes are executed using the input data to calculate output data, and the calculated output data is stored into the control program working area 1042. Note that one execution cycle of the second control program 230-2 corresponds to two control cycles, and therefore, if an interrupt for starting the next control cycle occurs before the end of execution of the second control program 230-2, the execution of the second control program 230-2 is temporarily interrupted, and the unexecuted part of the second control program 230-2 is executed in the next control cycle after the end of execution of the IO process program 218 and the first control program 230-1.

(7) In response to a command from the IO process program 218, the output data stored in the control program working area 1042 is transferred to the PLC system bus transmission buffer 1043 and/or the field network transmission buffer 1045.

<G. Configuration of Programs in Control Program and Flow of Instructions>

Next, a configuration of programs in a control program, and flow of instructions between the programs, will be described.

Figure 7:
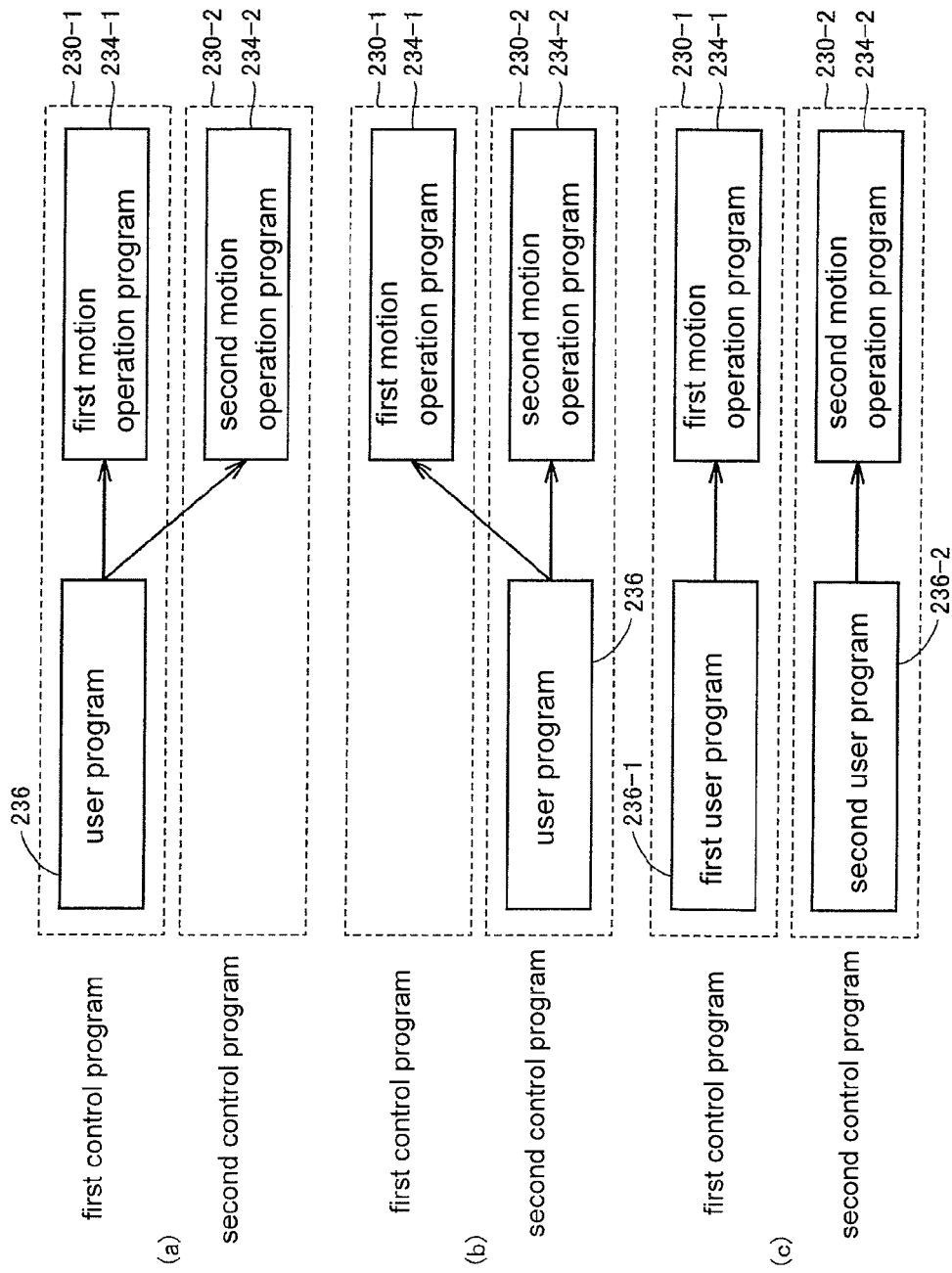
FIG. 7 is a schematic diagram for describing a configuration of programs in a control program and flow of instructions according to the embodiment of the present disclosure.

FIG. 7 is a schematic diagram for describing a configuration of programs in a control program and flow of instructions according to this embodiment of the present disclosure. FIG. 7 shows example variations of the user programs included in the first control program 230-1 and the second control program 230-2. Specifically, FIG. 7(a) shows an example in which only the first control program 230-1 has the user program 236. FIG. 7(b) shows an example in which only the second control program 230-2 has the user program 236. FIG. 7(c) shows an example in which both the first control program 230-1 and the second control program 230-2 have the user program 236.

In FIG. 7, arrows extending from the user program 236 (236-1 or 236-2 in FIG. 7(c)) to the motion operation program 234 (234-1 or 234-2) indicate flows of commands necessary for execution of the motion operation program 234. The commands are written in, for example, the user program 236 as an input parameter (an input constant or an input variable) for a motion function block which defines a motion control. When the user program is executed, and as a result, the motion control start condition is satisfied, so that the motion function block is executed, the input parameter is provided to the motion operation program.

The control program 230 may be configured as a thread including execution of the user program 236 and execution of the motion operation program 234.

When the control program 230 includes the user program 236 and the motion operation program 234, execution of the user program 236 may precede execution of the motion operation program 234, or vice versa. It is preferable that execution of the user program 236 precede execution of the motion operation program 234, because then the execution result of the user program 236 can be immediately used in execution of the motion operation program 234. On the other hand, if execution of the motion operation program 234 precedes execution of the user program 236, the execution result of the user program 236 is used in execution of the motion operation program 234 in the next execution cycle.

As shown in FIG. 6, if the next control cycle starts before the end of execution of the second control program 230-2 of which one execution cycle corresponds to two control cycles, the execution is interrupted, and is restarted after the end of execution of the first control program 230-1 in that next control cycle. The second control program 230-2 may be interrupted when the user program 236 included in the second control programs 230-2 is being executed or when the motion operation program 234 included in the second control program 230-2 is being executed.

(g1: Case where User Program is Included Only in First Control Program)

An embodiment in which the user program 236 is included only in the first control program 230-1 will be described with reference to FIG. 7(a). The embodiment of FIG. 7(a) can be employed when the user program 236 which provides both of the first motion operation program 234-1 and the second motion operation program 234-2 with commands, and the first motion operation program 234-1, can be executed in a desired control cycle time.

Specifically, in the example of FIG. 7(a), the first control program 230-1 includes the user program 236 including an instruction to provide the first motion operation program 234-1 with a command necessary for its execution, and an instruction to provide the second motion operation program 234-2 with a command necessary for its execution.

According to the embodiment of FIG. 7(a), in any execution cycle of the first motion operation program 234-1, a new command can be provided from the user program 236. Therefore, for example, a command for changing a movement of the motor which is running can quickly act on a motion control. Note that a command provided to the second motion operation program 234-2 during an execution cycle of the second motion operation program 234-2 acts on the second motion operation program 234-2 in the next execution cycle. Moreover, according to the embodiment of FIG. 7(a), only a single user program 236 is used, resulting in simple design.

(g2: Case where User Program is Included Only in Second Control Program)

An embodiment in which the user program 236 is included only in the second control program 230-2 will be described with reference to FIG. 7(b). The embodiment of FIG. 7(b) is suitable when a time which can be allocated to execution of the user program 236 in a desired control cycle time excluding the execution time of the first motion operation program 234-1, is short.

Specifically, in the example of FIG. 7(b), the second control program 230-2 includes the user program 236 including an instruction to provide the first motion operation program 234-1 with a command necessary for its execution, and an instruction to provide the second motion operation program 234-2 with a command necessary for its execution.

According to the embodiment of FIG. 7(b), the control cycle time can be reduced to a time sufficient to execute the first motion operation program 234-1. Note that a command from the user program 236 to the first motion operation program 234-1 is provided only at intervals equal to the execution cycle period of the second control program 230-2. However, once the motion operation program 234 is transitioned to the active state in response to a command (e.g., "move from a coordinate point A to a coordinate point B with a speed V) from the user program 236, motion command value data can be calculated at each execution cycle without a command from the user program 236 until execution of the command is completed. Therefore, if, during execution of the command, it is not necessary to provide a command for stopping the movement of the motor or a command for changing a motor movement to another motor movement to cause the motor to quickly react, the embodiment of FIG. 7(b) can be used without a problem. Moreover, according to this example, only a single user program 236 is used, resulting in simple design.

(g3: Case where User Program is Included in Both of First and Second Control Programs)

An embodiment in which user programs 236-1 and 236-2 are included in the first control program 230-1 and the second control program 230-2, respectively, will be described with reference to FIG. 7(c). Specifically, in the example of FIG. 7(c), the user program 236 includes the first user program 236-1 including an instruction to provide the first motion operation program 234-1 with a command necessary for its execution, and the second user program 236-2 including an instruction to provide the second motion operation program 234-2 with a command necessary for its execution. The first control program 230-1 includes the first user program 236-1, and the second control program 230-2 includes the second user program 236-2.

According to the embodiment of FIG. 7(c), the first user program 236-1 included in the first control program 230-1 does not have to execute a process related to providing the second motion operation program 234-2 with a command, resulting in a relatively short execution time. Therefore, a control cycle time in which the first user program 236-1 and the first motion operation program 234-1 can be executed can be caused to be relatively short. Moreover, in any execution cycle of the first motion operation program 234-1 and the second motion operation program 234-2, the user program 236-1 and 236-2 can provide respective new commands.

<H. Process Procedure>

Next, a process achieved by the system program 210 being executed by the microprocessor 100 of the PLC 1 will be described.

Figure 8:
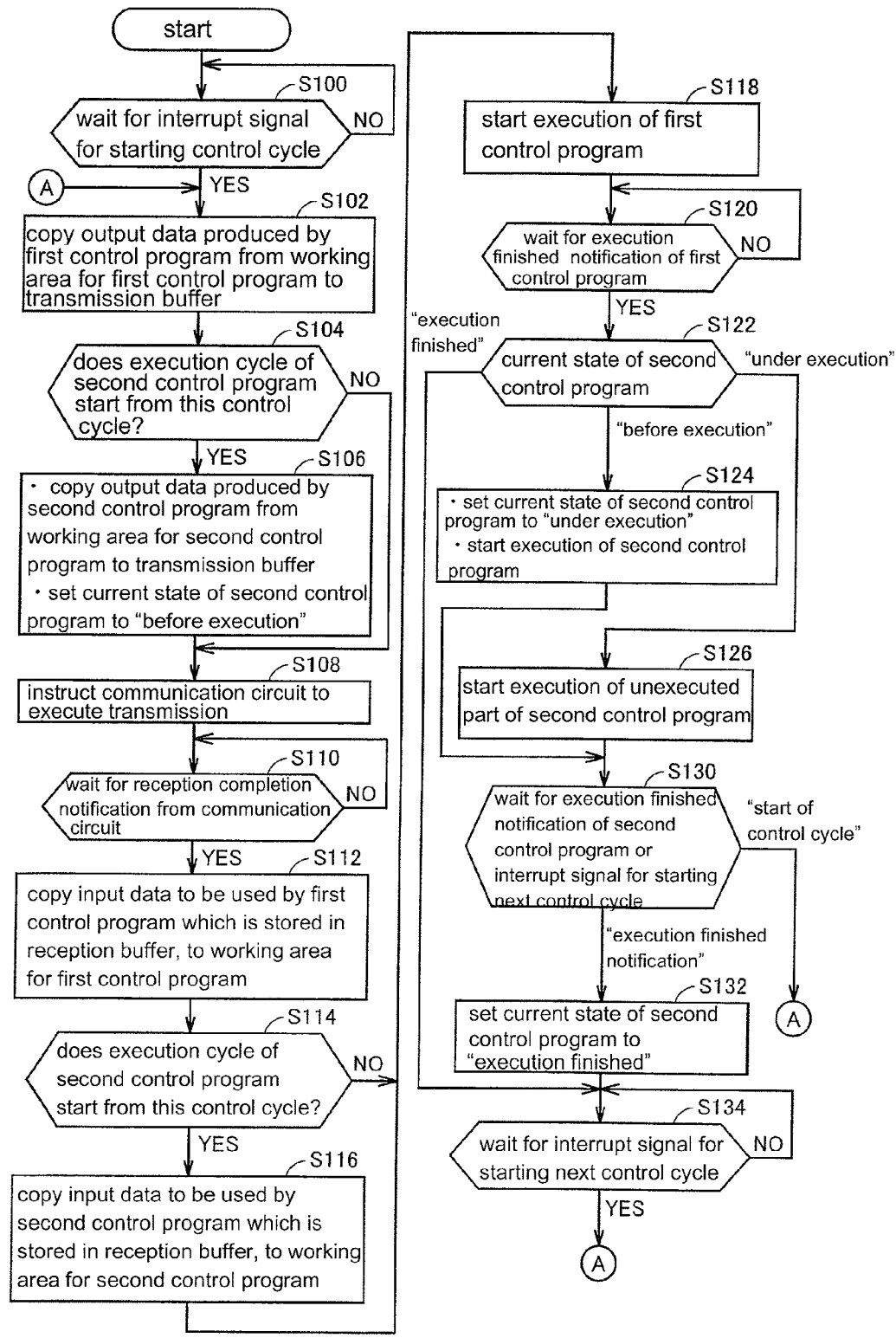
FIG. 8 is a flowchart showing a procedure of a process achieved by a system program being executed by a microprocessor of a CPU unit of the embodiment of the present disclosure.

FIG. 8 is a flowchart showing a procedure of a process achieved by the system program 210 being executed by the microprocessor 100 of the CPU unit of this embodiment of the present disclosure. Note that the flowchart of FIG. 8 shows the processes of steps S6-S16 in the flowchart of FIG. 5 in greater detail.

Referring to FIG. 8, the microprocessor 100 waits for an interrupt signal for starting a control cycle (step S100). When receiving an interrupt signal for starting a control cycle (YES in step S100), the microprocessor 100 copies output data produced by the first control program 230-1 from a working area (a part of the control program working area 1042) for the first control program 230-1 to the transmission buffer (the PLC system bus transmission buffer 1043 and/or the field network transmission buffer 1045) (step S102).

Following this, the microprocessor 100 determines whether or not an execution cycle of the second control program 230-2 is to start from this control cycle (step S14). If an execution cycle of the second control program 230-2 is to start from this control cycle (YES in step S104), the microprocessor 100 copies output data produced by the second control program 230-2 from a working area (a part of the control program working area 1042) for the second control program 230-2 to the transmission buffer (the PLC system bus transmission buffer 1043 and/or the field network transmission buffer 1045), and sets the current state of the second control program 230-2 to "before execution" (step S106).

Note that the system program 210 of this embodiment includes an instruction to monitor any of the following execution states: "before execution" in which, in an execution cycle in which a predetermined process is to be executed, the process has not yet been started; "under execution" in which the process is being executed in the execution cycle; and "execution finished" in which the process has already been completed in the execution cycle.

If an execution cycle of the second control program 230-2 is not to start from this control cycle (NO in step S104), the process of step S106 is skipped.

Following this, the microprocessor 100 instructs the communication circuit (the PLC system bus controller 120 and/or the field network controller 140) to execute transmission (step S108). In response to the transmission execution instruction, the communication circuit (the PLC system bus controller 120 and/or the field network controller 140) transmits output data stored in the transmission buffer (the PLC system bus transmission buffer 1043 and/or the field network transmission buffer 1045).

Thereafter, the microprocessor 100 waits for a reception completion notification from the communication circuit (the PLC system bus controller 120 and/or the field network controller 140) (step S110).

When receiving a reception completion notification from the communication circuit (YES in step S110), the microprocessor 100 copies input data to be used by the first control program 230-1 which is stored in the reception buffer (the PLC system bus reception buffer 1044 and/or the field network reception buffer 1046) to a working area (a part of the control program working area 1042) for the first control program 230-1 (step S112).

Following this, the microprocessor 100 determines whether or not an execution cycle of the second control program 230-2 is to start from this control cycle (step S114). If an execution cycle of the second control program 230-2 is to start from this control cycle (YES in step S114), the microprocessor 100 copies input data to be used by the second control program 230-2 which is stored in the reception buffer (the PLC system bus reception buffer 1044 and/or field network reception buffer 1046) to a working area (a part of the control program working area 1042) for the second control program 230-2 (step S116).

If an execution cycle of the second control program 230-2 is not to start from this control cycle (NO in step S114), the process of step S116 is skipped.

Following this, the microprocessor 100 starts execution of the first control program 230-1 (step S118). Thereafter, the microprocessor 100 waits for an execution end notification of the first control program 230-1 (step S120). Note that, in step S118, the start of execution of the first control program 230-1 switches a process executed by the microprocessor 100 from a process of the system program 210 to a process of the first control program 230-1. In other words, the microprocessor 100 does not execute the system program 210 for a period of time from the start to end of execution of the first control program 230-1.

When receiving an execution end notification from the first control program 230-1 (YES in step S120), the microprocessor 100 determines the current state of the second control program 230-2 (step S122).

If the current state of the second control program 230-2 is "before execution" ("before execution" in step S122), the microprocessor 100 sets the current state of the second control program 230-2 to "under execution," and starts execution of the second control program 230-2 (step S124). Thereafter, the process proceeds to step S130.

If the current state of the second control program 230-2 is "under execution" ("under execution" in step S122), the microprocessor 100 starts execution of an unexecuted part of the second control program 230-2 (step S126). Thereafter, the process proceeds to step S130.

If the current state of the second control program 230-2 is "execution finished" ("execution finished" in step S122), the process proceeds to step S134.

When starting execution of the second control program 230-2 in step S124 or S126, the microprocessor 100 waits for an execution end notification of the second control program 230-2 or an interrupt signal for starting the next control cycle (step S130). Note that the start of execution of the second control program 230-2 in step S124 or S126 switches a process executed by the microprocessor 100 from a process of the system program 210 to a process of the second control program 230-2. In other words, the microprocessor 100 does not execute the system program 210 for a period of time from the start to end of execution of the first control program 230-2. If an interrupt for starting the next control cycle occurs before the end of execution of the second control program 230-2, the real-time OS 200 interrupts the execution of the second control program 230-2 in the microprocessor 100, and causes the microprocessor 100 to restart execution of the system program 210. Alternatively, if there is a notification indicating the end of execution of the second control program 230-2 (an execution end notification of the second control program 230-2), a target executed by the microprocessor 100 is changed from the second control program 230-2 back to the system program 210.

When receiving an execution end notification of the second control program 230-2 ("execution end notification" in step S130), the microprocessor 100 sets the current state of the second control program 230-2 to "execution finished" (step S132). Thereafter, the process proceeds to step S134.

In step S134, the microprocessor 100 waits for an interrupt signal for starting the next control cycle (step S134). When receiving an interrupt for staring a control cycle (YES in step S134), the microprocessor 100 executes step S102 and the following steps again.

On the other hand, when receiving an interrupt for starting a control cycle before an execution end notification of the second control program 230-2 ("start of control cycle" in step S130), the second control program 230-2 which is being executed by the microprocessor 100 is interrupted, and the microprocessor 100 executes step S102 and the following steps again.

The process procedure of FIG. 8 can be summarized as follows.

Specifically, the control program 230 of this embodiment includes the first control program 230-1 and the second control program 230-1 (see FIG. 7). The first control program 230-1 includes the first motion operation program 234-1 for producing first motion command value data (output data) for controlling motor movement. The second control program 230-2 includes the second motion operation program 234-2 for producing second motion command value data (output data) for controlling motor movement.

Moreover, at least one of the first control program 230-1 and the second control program 230-2 includes the user program 236 (236-1 and 236-2 in FIG. 7(c)) created in accordance with an object of control of a user and including an instruction to provide the first motion operation program 234-1 and the second motion operation program 234-1 with a command necessary for execution.

The system program 210 of this embodiment includes a first execution control instruction (see FIG. 6) causing the microprocessor 100 to start execution of the first control program 230-1 at every first execution cycle of the same period as the control cycle period, and a second execution control instruction (see FIG. 6) causing the microprocessor 100 to start execution of the second control program 230-2 at every second execution cycle whose period is an integral multiple of at least twice the control cycle period.

The second execution control instruction includes an instruction causing the microprocessor 100 to start, in an control cycle in which the second execution cycle starts, execution of the second control program 230-2 after the end of execution of the first control program 230-1, and if the second control program 230-2 is not completed before the end of the control cycle, to start execution of an unexecuted part of the second control program 230-2 after the end of execution of the first control program 230-1 in the next control cycle (see FIG. 6).

<I. Support Device>

Next, the PLC support device 8 for, for example, producing a program to be executed by the PLC 1 and maintaining the PLC 1, will be described.

Figure 9:
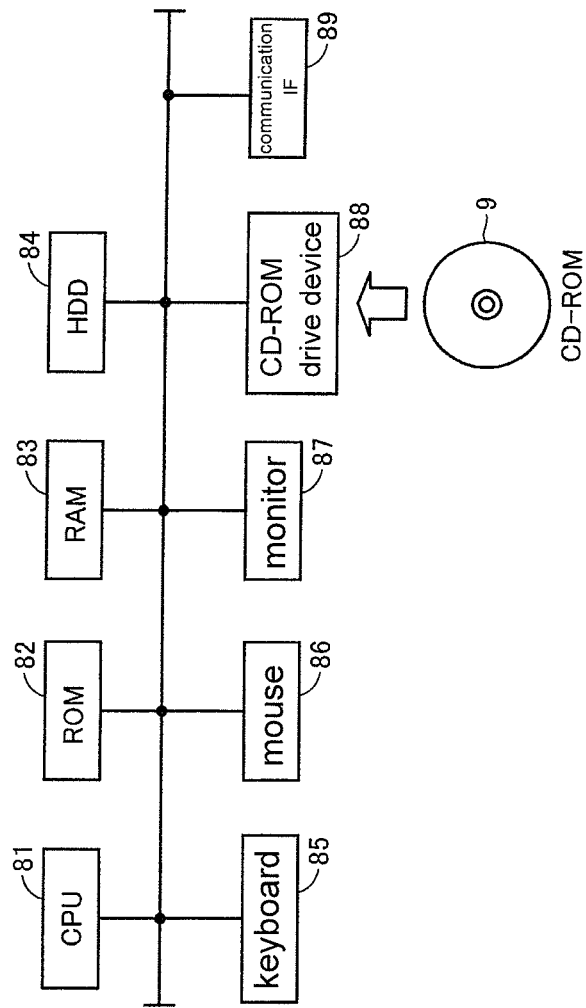
FIG. 9 is a schematic diagram showing a hardware configuration of a PLC support device which is, in use, connected to the CPU unit according to the embodiment of the present disclosure.

FIG. 9 is a schematic diagram showing a hardware configuration of the PLC support device 8 which is, in use, connected to the CPU unit of this embodiment of the present disclosure. Referring to FIG. 9, the PLC support device 8 is typically configured using a general-purpose computer. Note that a notebook-type personal computer, which has good portability, is preferable in terms of maintenance.

Referring to FIG. 9, the PLC support device 8 includes a CPU 81 which executes various programs including an OS, a ROM (Read Only Memory) 82 which stores a BIOS and various kinds of data, a memory RAM 83 which provides a working area for storing data required for execution of a program in the CPU 81, and a hard disk (HDD) 84 which stores the program executed by the CPU 81 in a non-volatile manner.

The PLC support device 8 further includes a keyboard 85 and a mouse 86 which receive the user's operation, and a monitor 87 which presents information to the user. The PLC support device 8 further includes a communication interface (IF) 89 for communicating with the PLC 1 (the CPU unit 13), etc.

As described below, various programs executed by the PLC support device 8 are distributed on a CD-ROM 9. The program stored on the CD-ROM 9 is read by a CD-ROM (Compact Disk-Read Only Memory) drive 88, and stored into the hard disk (HDD) 84, etc. Alternatively, the program may be downloaded from a host computer at a higher level via a network.

As described above, the PLC support device 8 is implemented using a general-purpose computer, and therefore, will not be described in greater detail.

Figure 10:
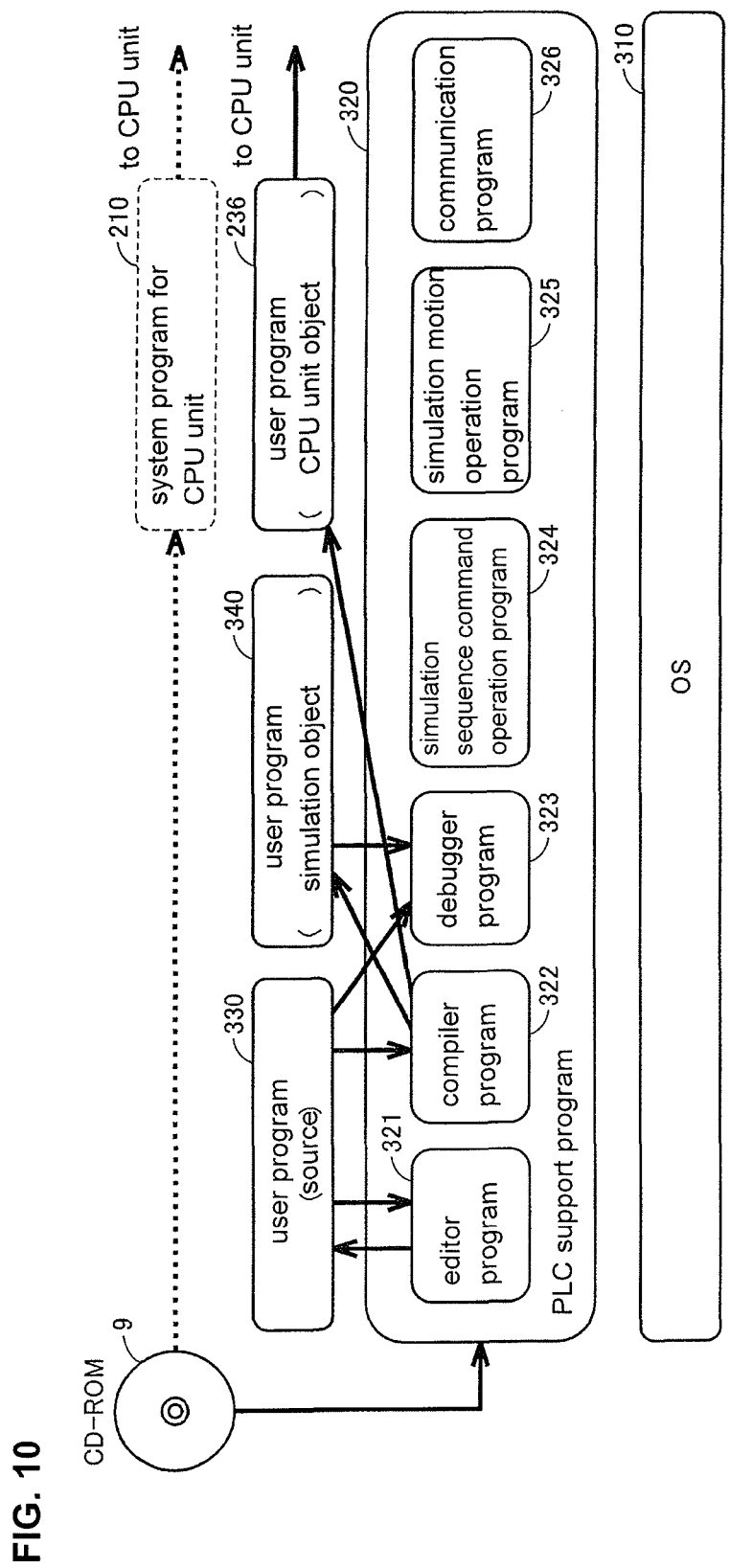
FIG. 10 is a schematic diagram showing a software configuration of the PLC support device which is, in use, connected to the CPU unit according to the embodiment of the present disclosure.

FIG. 10 is a schematic diagram showing a software configuration of the PLC support device 8 which is, in use, connected to the CPU unit of this embodiment of the present disclosure. Referring to FIG. 10, in the PLC support device 8, an OS 310 is executed, and an environment is provided in which various programs contained in a PLC support program 320 can be executed.

The PLC support program 320 includes an editor program 321, a compiler program 322, a debugger program 323, a simulation sequence command operation program 324, a simulation motion operation program 325, and a communication program 326. The programs contained in the PLC support program 320 are typically distributed on the CD-ROM 9, and installed in the PLC support device 8.

The editor program 321 provides a function, such as inputting and editing, for producing a user program 236. More specifically, the editor program 321 provides a function of enabling the user to produce a source program 330 for the user program 236 by operating the keyboard 85 or the mouse 86, and in addition, functions of saving and editing the produced source program 330. The editor program 321 receives an external source program 330.

The compiler program 322 provides a function of compiling the source program 330 to produce the user program 236 in the form of an object program which is executable by the microprocessor 100 of the CPU unit 13. The compiler program 322 also provides a function of compiling the source program 330 to produce a user program 340 in the form of an object program which is executable by the CPU 81 of the PLC support device 8. The user program 340 is a simulation object program which is used by the PLC support device 8 to simulate an operation of the PLC 1.

The debugger program 323 provides a function for debugging the source program for the user program. This debugging includes executing a partial range of the source program specified by the user, tracking changes in the value of a variable over time when the source program is being executed, etc.

The debugger program 323 further provides a function of executing the user program 340 which is an object program for simulation. In this simulation, a simulation sequence command operation program 324 and a simulation motion operation program 325 which are contained in the PLC support program 320 are used instead of the sequence command operation program 232 and the motion operation program 234 which are contained in the system program of the CPU unit 13.

The communication program 326 provides a function of transferring the user program 236 to the CPU unit 13 of the PLC 1.

Typically, the system program 210 is installed in the PLC 1 by being stored into the non-volatile memory 106 of the CPU unit 13 during manufacture of the CPU unit 13. Note that if the system program 210 is stored on the CD-ROM 9, the user may copy the system program 210 on the CD-ROM 9 to the PLC support device 8, and transfers the copied system program 210 to the CPU unit 13 using the function provided by the communication program 326. Moreover, if the real-time OS 200 which is executed by the CPU 13 of the PLC 1 is stored on the CD-ROM 9, the real-time OS 200 can be reinstalled by the user's operation.

<J. Advantages>

According to this embodiment, in a PLC having a motion control function, while execution cycles having a relatively short period are provided for some motion control processes requiring high-speed processing, other motion control processes can be executed at fixed periods.

For example, when a processing machine which cuts an object is controlled, a motion control process requiring a high-speed and high-precision control (e.g., a control of a movement of a cutter, and the like) can be executed at short periods, and a motion control process not requiring a very high speed (e.g., loading and unloading an object to be processed to and from the processing machine, and the like) can be executed at fixed intervals.

The present embodiments are to be considered in all respects as illustrative and not restrictive. The scope of the disclosure is indicated by the appended claims rather than by the foregoing description. All changes coming within the meaning and equivalency range of the appended claims are intended to be embraced therein.

INDEX TO THE REFERENCE NUMERALS

1 PLC, 2 field network, 3 servo motor driver, 4 servo motor, 5 terminal, 6 detection switch, 7 relay, 8 PLC support device, 9 CD-ROM, 10 connection cable, 11 PLC system bus, 12 power supply unit, 13 CPU unit, 14, 53 IO unit, 15 special unit, 51 terminal bus, 52 communication coupler, 81 CPU, 83 RAM, 85 keyboard, 86 mouse, 87 monitor, 88 drive, 100 microprocessor, 102 chip set, 104 main memory, 106 non-volatile memory, 108 system timer, 110 USB connector, 120 PLC system bus controller, 122 DMA control circuit, 124 PLC system bus control circuit, 126, 146 buffer memory, 130 connector, 140 field network controller, 142 DMA control circuit, 144 field network control circuit, 210, 220 system program, 212 scheduler program, 214 output process program, 216 input process program, 218 IO process program, 230 control program, 230-1 first control program, 230-2 second control program, 232 sequence command operation program, 234 motion operation program, 234-1 first motion operation program, 234-2 second motion operation program, 236 user program, 236-1 first user program, 236-2 second user program, 320 support program, 321 editor program, 322 compiler program, 323 debugger program, 324 simulation sequence command operation program, 325 simulation motion operation program, 326 communication program, 330 source program, 340 user program, 1041 program area, 1042 control program working area, 1043 PLC system bus transmission buffer, 1044 PLC system bus reception buffer, 1045 field network transmission buffer, 1046 field network reception buffer, 200 real-time OS, SYS system.

What is claimed is:

1. A central processing unit (CPU) of a programmable logic controller (PLC) for controlling an object, comprising:
   a microprocessor;
   a storage; and
   a communication circuit;
   said CPU unit of said PLC being configured to control the object by repeating transmission of output data, reception of input data and execution of a control program producing said output data using said input data; wherein
   said communication circuit transmits said output data and receives said input data in a control cycle period;
   said storage is used for storing a system program and said control program;
   said microprocessor executes said system program and said control program;
   said control program includes first and second control programs;
   said first control program includes a first motion operation program producing first motion command value data for controlling motor movement;

said second control program includes a second motion operation program producing second motion command value data for controlling motor movement;

at least one of said first and second control programs includes a user program created in accordance with an object of a user and including an instruction to provide said first and second motion operation programs with a command necessary for execution;

said system program includes a first execution control instruction causing said microprocessor to start execution of said first control program at every first execution cycle of the same period as said control cycle period, and a second execution control instruction causing said microprocessor to start execution of said second control program at every second execution cycle whose period is an integral multiple of at least twice said control cycle period; and said second execution control instruction includes an instruction causing said microprocessor to start, in said control cycle in which said second execution cycle starts, execution of said second control program after the end of execution of said first control program, and if said second control program is not completed before the end of said control cycle, to start execution of an unexecuted part of said second control program after the end of execution of said first control program in the next control cycle.

2. The CPU unit of a PLC according to claim 1, wherein said system program causes said microprocessor to execute a process for providing said output data to be transmitted with said first motion command value data updated by the execution of said first motion operation program, at each said first execution cycle, while said first motion operation program is in an active state, and a process for providing said output data to be transmitted with said second motion command value data updated by the execution of said second motion operation program, at least at each said second execution cycle, while said second motion operation program is in an active state.

3. The CPU unit of a PLC according to claim 2, wherein said first control program includes said user program including an instruction to provide said first motion operation program with a command necessary for its execution, and an instruction to provide said second motion operation program with a command necessary for its execution.

4. The CPU unit of a PLC according to claim 2, wherein said second control program includes said user program including an instruction to provide said first motion operation program with a command necessary for its execution, and an instruction to provide said second motion operation program with a command necessary for its execution.

5. The CPU unit of a PLC according to claim 2, wherein said user program includes a first user program including an instruction to provide said first motion operation program with a command necessary for its execution, and a second user program including an instruction to provide said second motion operation program with a command necessary for its execution;

said first control program includes said first user program; and said second control program includes said second user program.

6. The CPU unit of a PLC according to claim 1, wherein said first control program includes said user program including an instruction to provide said first motion operation program with a command necessary for its execution, and an instruction to provide said second motion operation program with a command necessary for its execution.

7. The CPU unit of a PLC according to claim 1, wherein said second control program includes said user program including an instruction to provide said first motion operation program with a command necessary for its execution, and an instruction to provide said second motion operation program with a command necessary for its execution.

8. The CPU unit of a PLC according to claim 1, wherein said user program includes a first user program including an instruction to provide said first motion operation program with a command necessary for its execution, and a second user program including an instruction to provide said second motion operation program with a command necessary for its execution;

said first control program includes said first user program; and said second control program includes said second user program.

9. A method for controlling motor movement of a machine, the motor movement to be executed with a programmable logic controller (PLC), the method comprising:

storing a first control program and a second control program in a storage;

transmitting output data and receiving input data over a communications circuit in a control cycle period;

generating a first execution control instruction causing a microprocessor to begin execution of the first control program at every first execution cycle of the same period as the control cycle period, the first control program producing a first motion command value data for controlling motor movement;

generating a second execution control instruction causing the microprocessor to begin execution of the second control program at every second execution cycle whose period is an integral multiple of at least twice the control cycle period, the second control program producing a second motion command value data for controlling motor movement;

wherein the second control instruction includes an instruction causing the microprocessor to begin, in a control cycle in which the second execution begins, execution of the second control program after an end of execution of the first control program, and wherein if the second control program is not completed before the end of the control cycle, to begin execution of an unexecuted portion of the second control program after the end of execution of the first control program in the next control cycle.

10. The method according to claim 9, further comprising:

providing the output data to be transmitted with a first motion command value data, at each first execution cycle, while the first motion operation program is in an active state, and providing the output data to be transmitted with the second motion command value data, at least at each second execution cycle, while the second motion operation program is in an active state.

11. A non-transitory computer readable medium storing a program that allows a computer apparatus to perform a process for controlling motor movement of a machine, the program allowing the computer apparatus to perform:

storing a first control program and a second control program in a storage;

transmitting output data and receiving input data over a communications circuit in a control cycle period;

generating a first execution control instruction causing a microprocessor to begin execution of the first control program at every first execution cycle of the same period as the control cycle period, the first control program producing a first motion command value data for controlling motor movement;

generating a second execution control instruction causing the microprocessor to begin execution of the second control program at every second execution cycle whose period is an integral multiple of at least twice the control cycle period, the second control program producing a second motion command value data for controlling motor movement;

wherein the second control instruction includes an instruction causing the microprocessor to begin, in a control cycle in which the second execution begins, execution of the second control program after an end of execution of the first control program, and wherein if the second control program is not completed before the end of the control cycle, to begin execution of an unexecuted portion of the second control program after the end of execution of the first control program in the next control cycle.

12. The non-transitory computer readable medium according to claim 11, the computer apparatus further performing:

providing the output data to be transmitted with a first motion command value data, at each first execution cycle, while the first motion operation program is in an active state, and providing the output data to be transmitted with the second motion command value data, at least at each second execution cycle, while the second motion operation program is in an active state.

* * * * *